US012500442B1

(12) United States Patent
Ke et al.

(10) Patent No.: US 12,500,442 B1
(45) Date of Patent: Dec. 16, 2025

(54) EMERGENCY POWER SUPPLY CIRCUIT AND LIGHTING DEVICE

(71) Applicant: SHENZHEN BILLDA TECHNOLOGY CO., LTD, Guangdong (CN)

(72) Inventors: Jianjun Ke, Guangdong (CN); Weichang Wu, Guangdong (CN); Peizhi Chen, Guangdong (CN); Qiu Feng, Guangdong (CN)

(73) Assignee: SHENZHEN BILLDA TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/941,256

(22) Filed: Nov. 8, 2024

(30) Foreign Application Priority Data

Aug. 14, 2024 (CN) .......................... 202411118622.4

(51) Int. Cl.
*H02J 9/02* (2006.01)
*F21S 9/02* (2006.01)
*H02J 7/00* (2006.01)
*H02J 7/02* (2016.01)

(52) U.S. Cl.
CPC ................. *H02J 9/02* (2013.01); *F21S 9/022* (2013.01); *H02J 7/00302* (2020.01); *H02J 7/0063* (2013.01); *H02J 7/02* (2013.01)

(58) Field of Classification Search
CPC ........ H02J 9/02; H02J 7/00302; H02J 7/0063; H02J 7/02; F21S 9/022
See application file for complete search history.

(56) References Cited

U.S. PATENT DOCUMENTS

2017/0051886 A1* 2/2017 Liu ........................ H05B 45/10

* cited by examiner

*Primary Examiner* — Carlos Amaya
(74) *Attorney, Agent, or Firm* — HOWARD M COHN and Associates, LLC

(57) ABSTRACT

The application provides an emergency power supply circuit and a lighting device. A main control unit monitors an output voltage of a charging circuit; when the charging circuit is abnormal, an auxiliary power supply is connected to an energy storage unit by means of an auxiliary power supply control circuit to charge the energy storage unit to ensure the power supply stability of the energy storage unit; a boost unit is controlled to be turned on by means of a boost control circuit to boost an output voltage of the energy storage unit to ensure that the output voltage can satisfy the operating voltage requirement of a load; and the boost circuit is electrically connected to a drive control unit by means of a feedback unit to regulate the output volage in real time so as to provide a stable boosted voltage for the load.

10 Claims, 6 Drawing Sheets

EMERGENCY POWER SUPPLY CIRCUIT AND LIGHTING DEVICE

BACKGROUND OF THE INVENTION

1. Technical Field

The application relates to the technical field of circuits, in particular to an emergency power supply circuit and a lighting device.

2. Description of Related Art

An emergency power supply can supply power in case of a fault of a main power supply or a power failure to ensure normal operation of equipment or systems. For example, in case of a grid fault, the emergency power supply can automatically turn on a lamp of an emergency lighting device and turn off the lamp when a battery pack runs out. The emergency power supply supplies power to a load mainly by means of an energy storage device such as a storage battery, and the energy storage device is generally designed to output a standard supply voltage. Therefore, in some special scenarios such as scenarios with high lighting requirements, the emergency power supply will not be able to drive a lamp to emit light, and in a case where a grid fault lasts for a long time, the output voltage may be unstable due to the deficiency of power supplied to the lamp by means of electric energy stored in the storage battery, and as a result, the lamp will not be able to emit light normally, leading to flicker or low brightness.

BRIEF SUMMARY OF THE INVENTION

The main objective of the application is to provide an emergency power supply circuit and a lighting device to solve the problems of poor adaptability and stability of the output voltage of emergency power supplies in the related art.

To fulfill the above objective, in a first aspect, the application provides an emergency power supply circuit, comprising a charging circuit, an energy storage unit, a main control unit, an auxiliary power supply, a boost circuit, an auxiliary power supply control circuit and a boost control circuit, wherein the boost circuit comprises a boost unit, a feedback unit and a drive control unit; the charging circuit is electrically connected to the energy storage unit and the main control unit and is configured to be electrically connected to an external power grid, the auxiliary power supply control circuit is electrically connected to the auxiliary power supply, the main control unit and the energy storage unit, the boost control circuit is electrically connected to the boost unit, the energy storage unit and the main control circuit, the drive control unit is electrically connected to the boost unit and the feedback unit, and the boost unit is configured to be electrically connected to an external load.

Further, the boost unit comprises an inductor and a first switch transistor, one terminal of the inductor is electrically connected to the boost control circuit, the other terminal of the inductor is electrically connected to a first terminal of the first switch transistor and is configured to be electrically connected to the external load, a second terminal of the first switch transistor is electrically connected to the drive control unit, and a third terminal of the first switch transistor is electrically connected to the feedback unit.

Further, the feedback unit comprises a first voltage sampling circuit and a first current sampling circuit, the first voltage sampling circuit is electrically connected to the other terminal of the inductor and the drive control circuit, and the first current sampling circuit is electrically connected to the third terminal of the first switch transistor and the drive control circuit.

Further, the charging circuit comprises a second rectifier and filter circuit, a transformer, a drive chip and a charging protection circuit, the second rectifier and filter circuit is electrically connected to a primary winding of the transformer and the external power grid, the drive chip is electrically connected to the primary winding and one terminal of the charging protection circuit, a secondary winding of the transformer is electrically connected to the energy storage unit, and the other terminal of the charging protection circuit is electrically connected to the energy storage unit.

In a second aspect, the application provides a lighting device, comprising the emergency power supply circuit in the first aspect of the application.

From the above description, the energy storage unit is charged by the charging circuit, and the main control unit monitors an output voltage of the charging circuit; when it is detected that the charging circuit is abnormal, the auxiliary power supply is connected to the energy storage unit by means of the auxiliary power supply control circuit to charge the energy storage unit to ensure the power supply stability of the energy storage unit; moreover, the energy storage unit is connected to the boost unit by means of the boost control circuit to boost an output voltage of the energy storage unit so as to drive the external load by means of the boosted voltage to ensure that the output voltage satisfies the operating voltage requirement of the load; and the boost circuit is connected to the drive control unit by means of the feedback unit to regulate the output voltage in real time so as to provide a stable boosted voltage for the load to guarantee the operating stability of the load.

BRIEF DESCRIPTION OF THE SEVERAL VIEWS OF THE DRAWINGS

To more clearly explain the technical solutions in the embodiments of the invention or the prior art, drawings used for describing the embodiments of the invention or the prior art are briefly introduced below. Obviously, the drawings in the following description merely illustrate some embodiments of the invention, and those skilled in the art can obtain other drawings according to the following ones without creative labor.

DETAILED DESCRIPTION OF THE INVENTION

To make the purposes, features and advantages of the application more obvious and easily understood, the technical solutions in the embodiments of the application are clearly and completely described below in conjunction with the drawings of the embodiments. Obviously, the embodiments in the following description are merely illustrative ones, and are not all possible ones of the application. All other embodiments obtained by those skilled in the art based on the following ones without creative labor should also fall within the protection scope of the application.

In view of the problem of poor adaptability and stability of the output voltage of emergency power supplies in the related art, one embodiment of the application provides an emergency power supply circuit.

Figure 1:
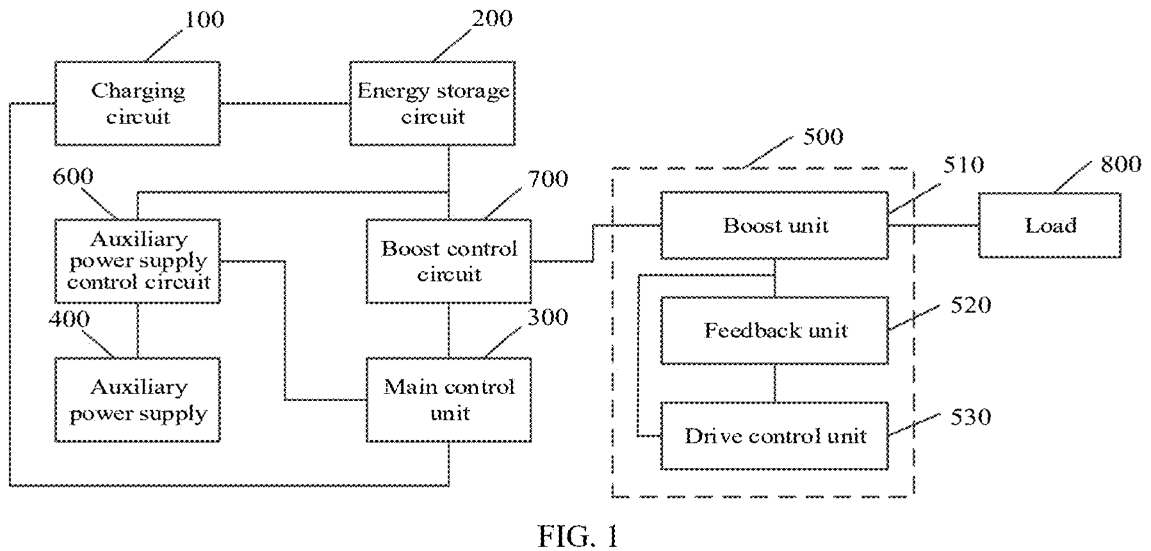
FIG. 1 is a schematic structural diagram of an emergency power supply circuit according to one embodiment of the application.

As shown in FIG. 1 which is a schematic structural diagram of an emergency power supply circuit according to one embodiment of the application, the emergency power supply circuit comprises: a charging circuit 100, an energy storage unit 200, a main control unit 300, an auxiliary power supply 400, a boost circuit 500, an auxiliary power supply control circuit 600 and a boost control circuit 700, wherein the boost circuit 500 comprises a boost unit 510, a feedback unit 520 and a drive control unit 530, the charging circuit 100 is electrically connected to the energy storage unit 200 and the main control unit 300 and is configured to be electrically connected to an external power grid, the auxiliary power supply control circuit 600 is electrically connected to the auxiliary power supply 400, the main control unit 300 and the energy storage unit 200, the boost control circuit 700 is electrically connected to the boost unit 510, the energy storage unit 200 and the main control unit 300, the drive control unit 530 is electrically connected to the boost unit 510 and the feedback unit 520, and the boost unit 510 is configured to be electrically connected to an external load 800.

Specifically, in this embodiment, the charging circuit 100 is connected to the external power grid to charge the energy storage unit 200, wherein the energy storage unit 200 may be a storage battery; the main control unit 300 is used for monitoring an output voltage of the charging circuit 100 to determine whether the external power grid is normal; when it is detected that the charging circuit 100 is abnormal, the auxiliary power supply 400 is connected to the energy storage unit 200 by means of the auxiliary power supply control circuit 600 to charge the energy storage unit 200 to ensure a sufficient reserve of electricity in the energy storage unit 200, thus improving power supply stability; moreover, the energy storage unit 200 is connected to the boost unit 510 by means of the boost control circuit 700 to boost an output voltage of the energy storage unit 200 so as to drive the external load 800 by means of the boosted voltage to ensure that the output voltage satisfies the operating voltage requirement of the load 800; and the boost circuit 500 is connected to the drive control unit 530 by means of the feedback unit 520 to regulate the output voltage in real time so as to provide a stable boosted voltage for the load 800 to guarantee the operating stability of the load 800.

Figure 2:
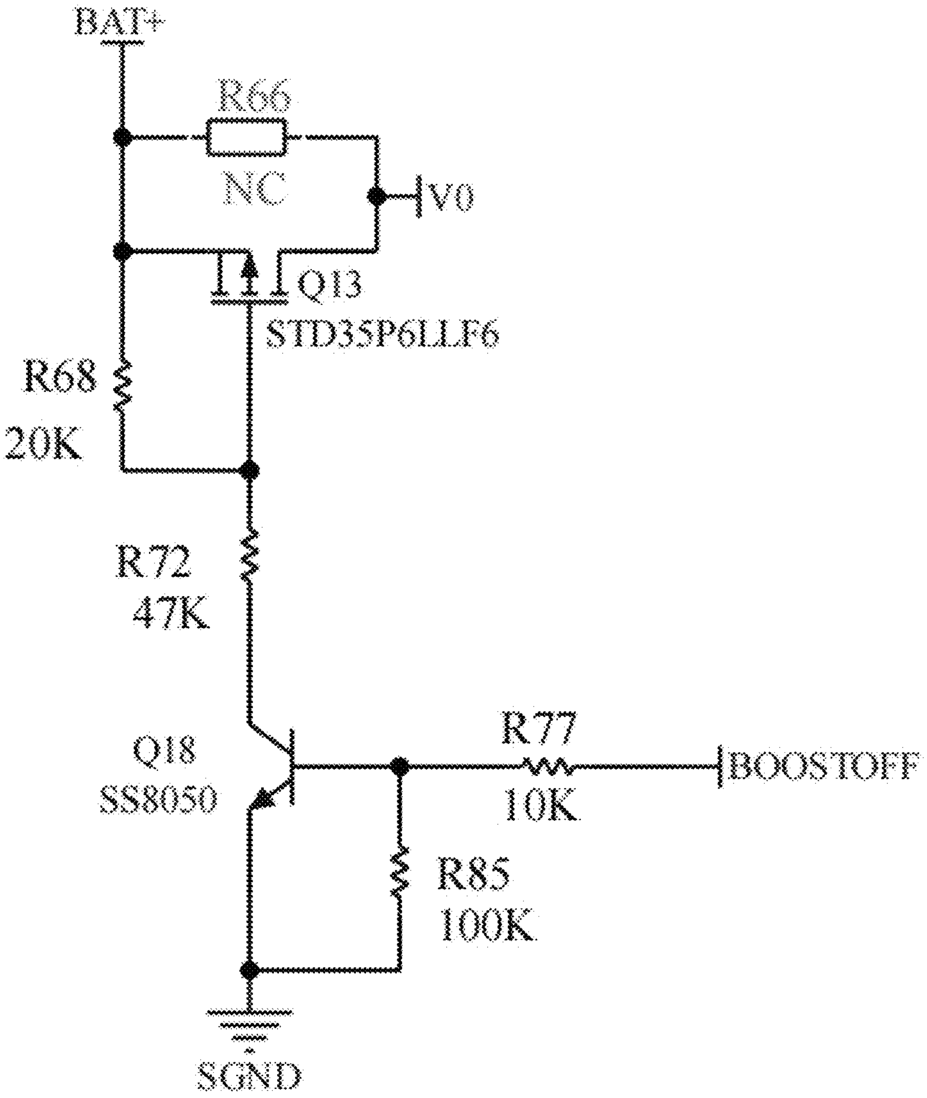
FIG. 2 is a schematic circuit diagram of a boost control circuit according to one embodiment of the application.
Figure 3:
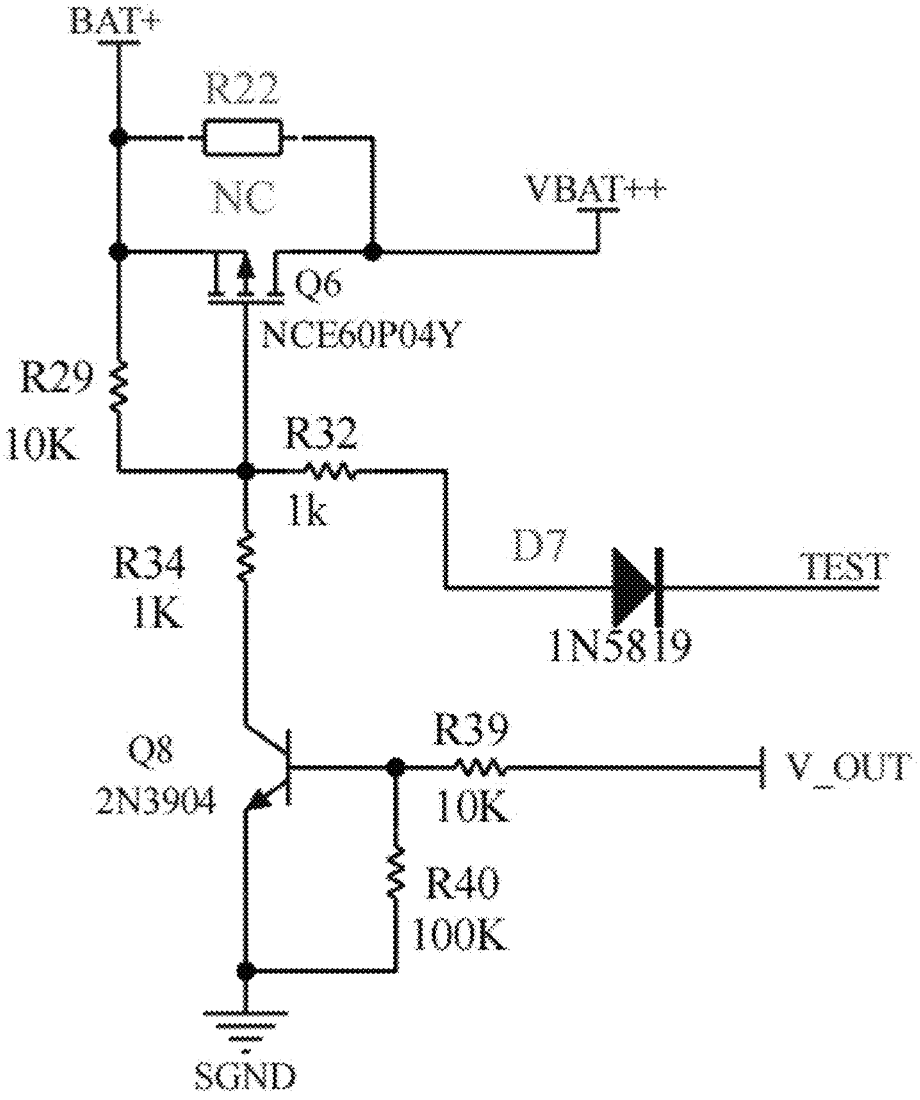
FIG. 3 is a schematic circuit diagram of an auxiliary power supply control circuit according to one embodiment of the application.
Figure 4:
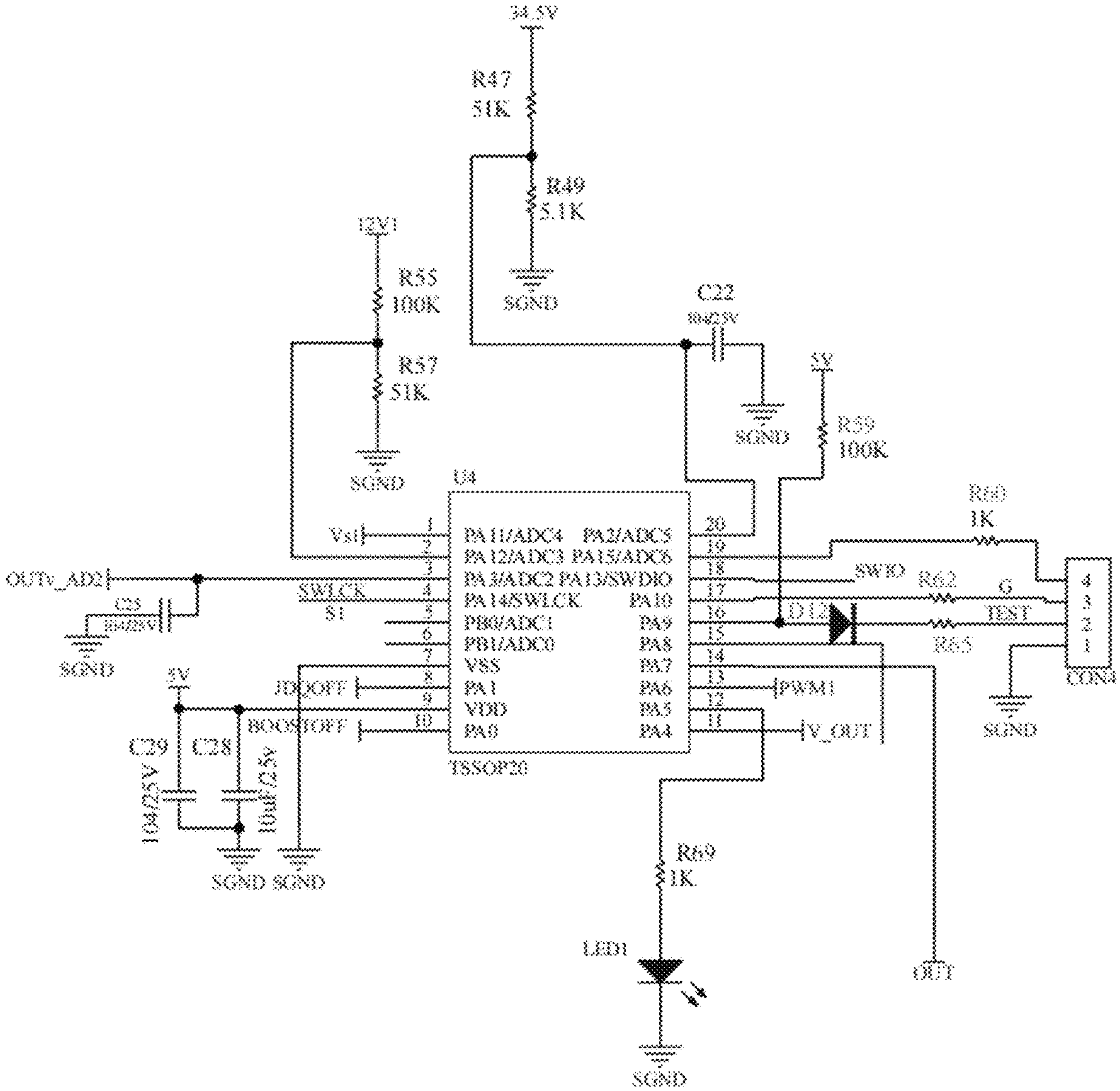
FIG. 4 is a schematic circuit diagram of a main control unit according to one embodiment of the application.

Referring to FIGS. 2, 3 and 4 which are respectively a schematic circuit diagram of the boost control circuit, a schematic circuit diagram of the auxiliary power supply control circuit and a schematic circuit diagram of the main control unit in this embodiment, the boost control circuit 700 and the auxiliary power supply control circuit 600 each comprise a third switch transistor Q18 or Q8 and a fourth switch transistor Q13 or Q6, wherein a first terminal of the third switch transistor Q18 or Q8 is electrically connected to the main control unit 300, a second terminal of the third switch transistor Q18 or Q8 is electrically connected to a first terminal of the fourth switch transistor Q13 or Q6, a third terminal of the third switch transistor Q18 or Q8 is grounded, a second terminal of the fourth switch transistor Q13 or Q6 is electrically connected to the energy storage unit 200, and a third terminal of the fourth switch transistor Q13 or Q6 is electrically connected to the boost unit 510 or the auxiliary power supply 400. In addition, the fourth switch transistor Q6 of the auxiliary power supply control circuit 600 is connected to an external key by means of a resistor R32 and a diode D7, and when the external key is pressed, a low-level signal will be transmitted to a gate of the fourth switch transistor Q6 to turn on the fourth switch transistor Q6.

Wherein, the third switch transistor Q18 or Q8 may be, for example, an NPN triode as shown in FIG. 2 and FIG. 3, the fourth switch transistor Q13 or Q6 may be, for example, an MOS transistor as shown in FIG. 2 or a PMOS transistor as shown in FIG. 3, the third switch transistor Q18 or Q8 and the fourth switch transistor Q13 or Q6 are connected to bias voltage supply circuits, the bias voltage supply circuit connected to the third switch transistor Q18 or Q8 comprises a resistor R39 or R77 and a resistor R40 or R85, and the bias voltage supply circuit connected to the fourth switch transistor Q13 or Q6 comprises a resistor R29 or R68 and a resistor R34 or R72.

Specifically, in this embodiment, the main control unit 300 may be an MCU, wherein a pin 20 of the MCU detects the output voltage of the charging circuit 100 by means of a voltage sampling circuit (a voltage sampling circuit formed by a resistor R47 and a resistor R49); in case of an outage of the external power grid, a high-level signal is transmitted to the auxiliary power supply control circuit 600 and the boost control circuit 700 by means of a pin 11 and a pin 10, and at this moment, the third switch transistor Q18 or Q8 will be turned on to drive the fourth switch transistor Q13 or Q6 to be turned on, such that the auxiliary power supply 400 (VBAT++ in FIG. 2) is connected to the energy storage unit 200 (BAT+ in FIG. 2), and the energy storage unit 200 is continuously charged by the auxiliary power supply 400; the energy storage unit 200 is connected to an input terminal of the boost unit 510 (an input voltage of the boost unit 510 is V0) to boost the output voltage of the energy storage unit 200 to obtain a boosted voltage such as 48V, and the boosted voltage is transmitted to the external load.

Figure 5:
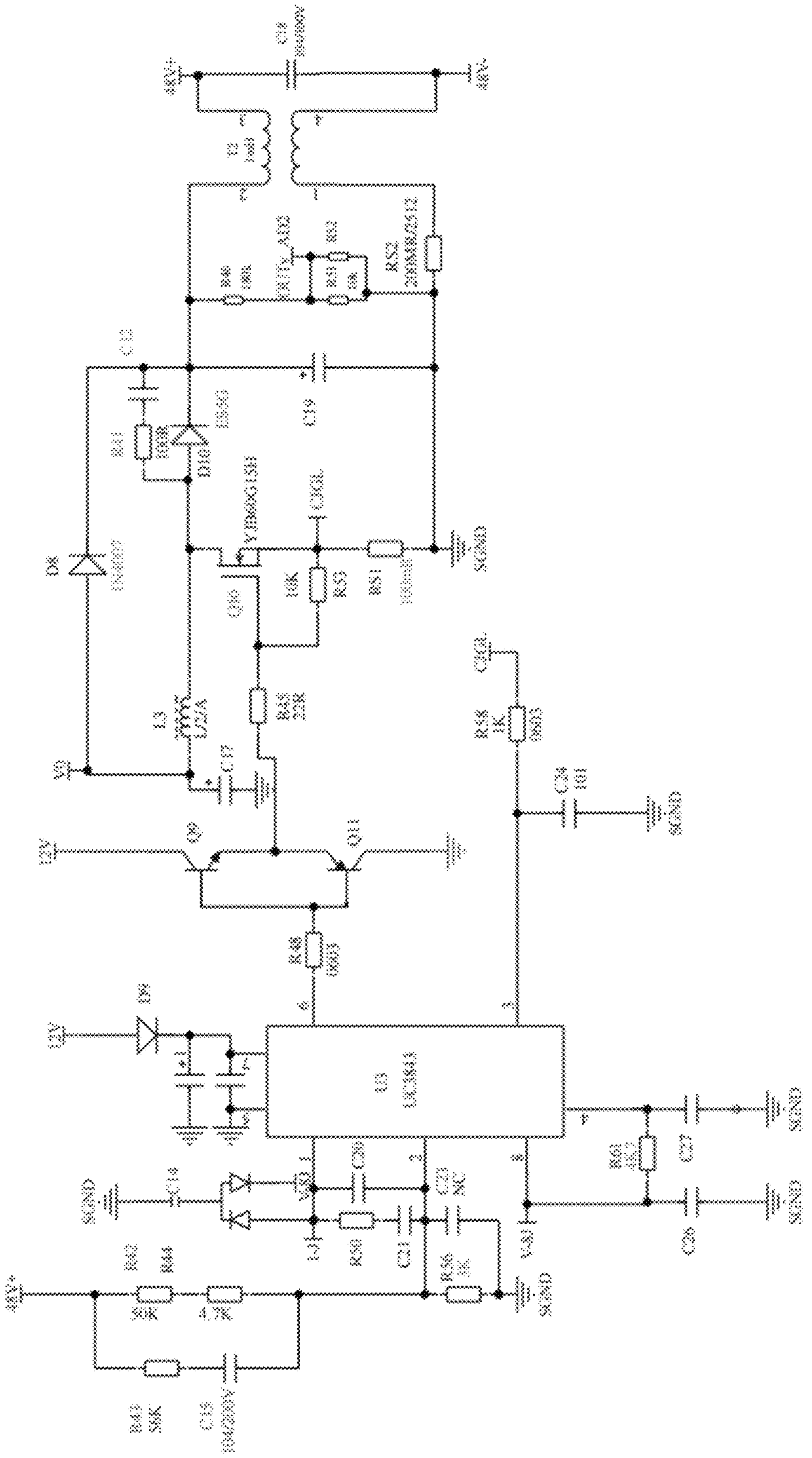
FIG. 5 is a schematic circuit diagram of a boost circuit according to one embodiment of the application.

Referring to FIG. 5 which is a schematic circuit diagram of the boost circuit according to this embodiment, the boost unit 510 comprises an inductor L3 and a first switch transistor Q10, wherein one terminal of the inductor L3 is electrically connected to the boost control circuit 700, the other terminal of the inductor L3 is electrically connected to a first terminal of the first switch transistor Q10 and is configured to be electrically connected to the external load 800, a second terminal of the first switch transistor Q10 is electrically connected to the drive control unit 530, and the first switch transistor Q10 is electrically connected to the feedback unit 520.

Further, referring to FIG. 5, the boost circuit 500 further comprises a first diode D8 and a first rectifier and filter circuit, wherein a positive pole of the first diode D8 is electrically connected to one terminal of the inductor L3, a negative pole of the first diode D8 is electrically connected to a first terminal of the first rectifier and filter circuit, a second terminal of the first rectifier and filter circuit is electrically connected to the other terminal of the inductor L3, and a third terminal of the first rectifier and filter circuit is configured to be electrically connected to the external load 800.

Wherein, the first rectifier and filter circuit comprises a diode D10, a capacitor C19, a common-mode choke T2, a capacitor C18 and a resistor RS2, wherein a positive pole of the diode D10 is electrically connected to the inductor L3, a negative pole of the diode D10 is electrically connected to a first terminal of the common-mode choke T2 and the negative pole of the first diode D8, one terminal of the capacitor C19 is electrically connected to the negative pole of the diode D10, the other terminal of the capacitor C19 is grounded, a second terminal of the commo-mode choke T2 is electrically connected to one terminal of the resistor RS2, a third terminal and a fourth terminal of the common-mode choke T2 are electrically connected to the external load, the other terminal of the resistor RS2 is grounded, and the capacitor C18 is electrically connected to the third terminal and the fourth terminal of the common-mode choke T2. The first rectifier and filter circuit further comprises a capacitor C12 and a resistor R41, wherein the resistor R41 is electrically connected to the positive pole of the diode D10 and one terminal of the capacitor C12, and the other terminal of the capacitor C12 is electrically connected to the negative pole of the diode D10.

Specifically, in this embodiment, the boost circuit 500 boosts a voltage, then rectifies and filters the boosted voltage and finally transmits the voltage to the external load, wherein the diode D10 is used for rectifying the output voltage, and the capacitor C12 and the resistor R41 form an RC absorption circuit which can divides and absorb a peak voltage to reduce the peak voltage so as to guarantee the stability and reliability of the diode D10; and the capacitor C19, the common-mode choke T2, the capacitor C18 and the resistor RS2 are used for filtering. In addition, the boost circuit 500 further comprises the first diode D8, and the first diode D8 is connected in parallel to the inductor L3 and used for preventing the inductor L3 from being fully charged in case of a short circuit of the capacitor C19.

Further, referring to FIG. 5, the feedback unit 520 comprises a first voltage sampling circuit and a first current sampling circuit, wherein the first voltage sampling circuit is electrically connected to the other terminal of the inductor L3 and the drive control circuit, and the first current sampling circuit is electrically connected to the third terminal of the first switch transistor Q10 and the drive control circuit.

Wherein, the first current sampling circuit comprises a resistor RS1 and a resistor R58, wherein one terminal of the resistor RS1 is electrically connected to the first switch transistor Q10 and one terminal of the resistor R58, the other terminal of the resistor RS1 is grounded, and the other terminal of the resistor R58 is electrically connected to a current detection terminal of the drive control unit 530. The first voltage sampling circuit comprises a resistor R42, a resistor R44, a resistor R56 and a snubber circuit, wherein one terminal of the resistor R42 is electrically connected to the inductor L3 and one terminal of a snubber circuit, the other terminal of the resistor R42 is electrically connected to one terminal of the resistor R44, the other terminal of the resistor R44 is electrically connected to one terminal of the resistor R56, the other terminal of the snubber circuit and a feedback voltage input terminal of the drive control unit 530, and the other terminal of the resistor R56 is grounded. The snubber circuit comprises a resistor R43 and a capacitor C15, wherein the resistor R43 is electrically connected to one terminal of the resistor R42 and one terminal of the capacitor C15, and the other terminal of the capacitor C15 is electrically connected to the other terminal of the resistor R44. The drive control unit 530 may be a UC3843 controller, and the first switch transistor Q10 may be, for example, an NMOS transistor as shown in FIG. 5. In addition, the boost circuit 500 further comprises a voltage sampling circuit, which is formed by a resistor R46, a resistor R51 and a resistor R52 in FIG. 5, wherein one terminal of the voltage sampling circuit is connected to an output terminal of the boost unit 510, the other terminal of the voltage sampling circuit is connected to a pin 3 of the MCU, and the MCU controls the boost circuit 500 according to a voltage feedback signal.

Specifically, in this embodiment, the drive control unit 530 is used for outputting a drive signal to the first switch transistor Q10 to periodically turn on and off the first switch transistor Q10 according to the drive signal; in each on-off cycle, when the first switch transistor Q10 is turned on, the inductor L3 stores energy to increase the output voltage; when the first switch transistor Q10 is turned off, the inductor L3 releases energy and transmits the energy to the external load such as an LED unit. The first voltage sampling circuit is used for acquiring an output voltage, transmitting the output voltage to the drive control unit 530, comparing the output voltage with a reference voltage of an error amplifier in the drive control unit 530 to generate a control voltage, and adjusting the duty cycle or pulse width of the drive signal to control the on-time of the first switch transistor Q10 so as to regulate the output voltage. The first current sampling circuit is used for acquiring an output current, converting the output current into a voltage and then transmitting the voltage to the drive control unit 530, and the drive control unit 530 adjusts the duty cycle or pulse width of the drive signal according to a feedback voltage. In this way, two sampling circuits are used for feedback to stabilize an output boosted voltage at a set voltage value, thus providing a stable and reliable supply voltage for the external load 800.

In addition, to guarantee power supply safety, a short-circuit protection circuit may be designed between the output of the boost circuit 500 and the load 800, and the short-circuit protection circuit is mainly formed by a comparison circuit, a current sampling circuit, a thyristor and an NMOS transistor; the comparison circuit is electrically connected to the output terminal of the boost circuit 500, one terminal of the current sampling circuit and a first terminal of the thyristor, the other terminal of the current sampling circuit is electrically connected to a source of the NMOS transistor, a gate of the NMOS transistor is electrically connected to a second terminal of the thyristor, a drain of the NMOS transistor is configured to be electrically connected to the external load 800, and a third terminal of the thyristor is grounded. Wherein, the current sampling circuit is used for acquiring a current in a power supply circuit and transmitting the current to the comparison circuit, and the comparison circuit determines whether the power supply circuit is short-circuited; in a case where the power supply circuit is short-circuited, the comparison circuit outputs a short-circuit protection signal to the thyristor, and when receiving the short-circuit protection signal transmitted from the comparison circuit, the thyristor will be kept in an on-state until it receives an off-signal to completely turn off the NMOS transistor so as to completely disconnect the power supply circuit from the load 800, thus realizing short-circuit protection.

Figure 6:
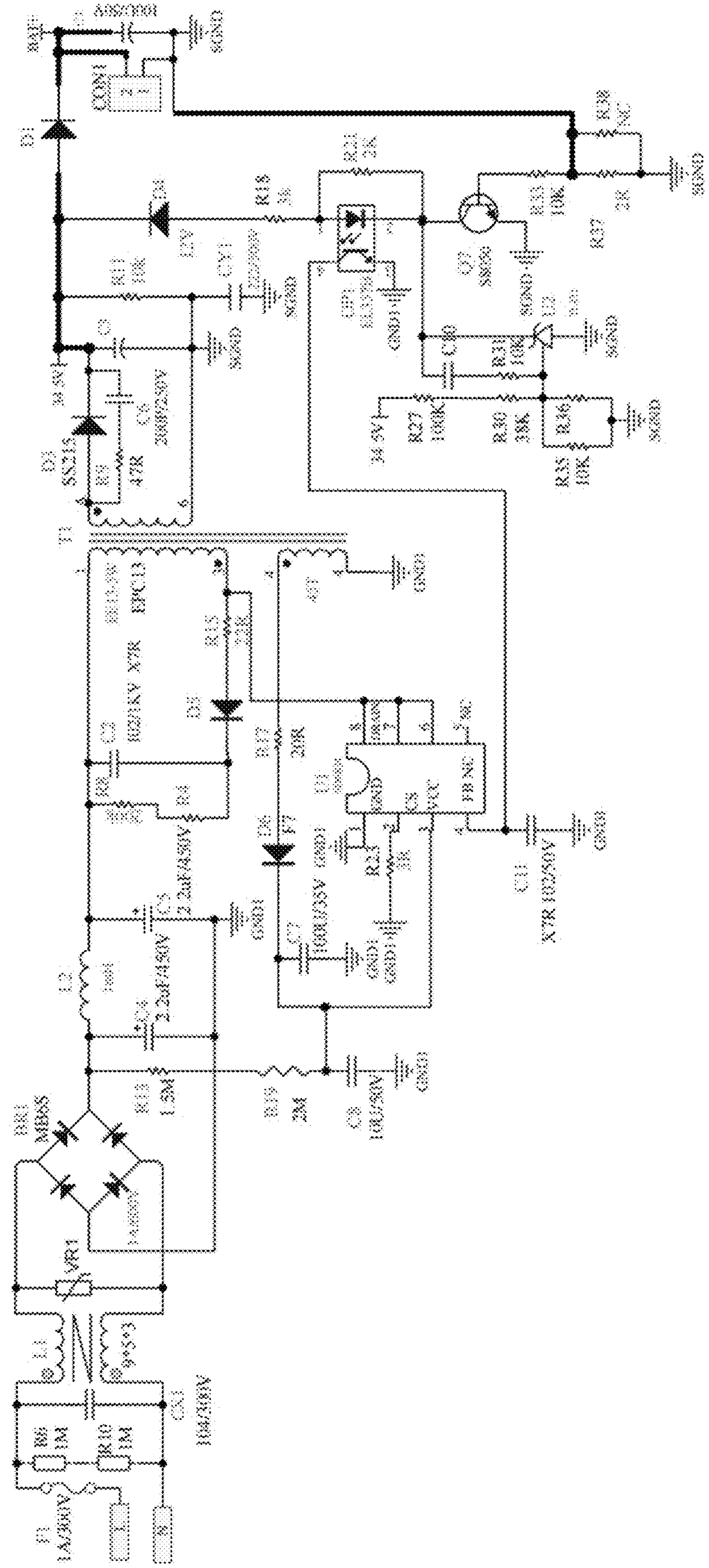
FIG. 6 is a schematic circuit diagram of a charging circuit according to one embodiment of the application.

Refereeing to FIG. 6 which is a schematic circuit diagram of the charging circuit according to this embodiment, the charging circuit 100 comprises a second rectifier and filter circuit, a transformer T1, a drive chip U1 and a charging protection circuit, wherein the second rectifier and filter circuit is electrically connected to a primary winding of the transformer T1 and is configured to be electrically connected to the external power grid, the drive chip U1 is electrically connected to the primary winding and one terminal of the charging protection circuit, a secondary winding of the transformer T1 is electrically connected to the energy storage unit 200, and the other terminal of the charging protection circuit is electrically connected to the energy storage unit 200. Wherein, the second rectifier and filter circuit comprises a common-mode choke L1, a bridge rectifier circuit, a differential-mode choke L2 and a resistor-capacitor unit. In addition, the secondary winding of the transformer T1 is connected to a diode D3 and a diode D1, wherein the diode D3 is used for rectification, and the diode D1 is used for preventing reversing.

Further, referring to FIG. 6, the charging protection circuit comprises an optocoupler OP1, a second switch transistor Q7 and a second current sampling circuit, wherein the second current sampling circuit is electrically connected to the energy storage unit 200 and a first terminal of the second switch transistor Q7, a second terminal of the second switch transistor Q7 is electrically connected to a first terminal of the optocoupler OP1, a third terminal of the second switch transistor Q7 is grounded, a second terminal of the optocoupler OP1 is electrically connected to the secondary winding, a third terminal of the optocoupler OP1 is electrically connected to the drive chip U1, and a fourth terminal of the optocoupler OP1 is grounded. Wherein, the second current sampling circuit is mainly formed by a resistor R33 and a resistor R37.

Further, referring to FIG. 6, the charging circuit 100 further comprises a voltage stabilizing circuit, which comprises a stabilivolt U2, a second diode D4, a second voltage sampling circuit and the optocoupler OP1, wherein the voltage stabilizing circuit is electrically connected to the first terminal of the optocoupler OP1 and one terminal of the second voltage sampling circuit, the other terminal of the second voltage sampling circuit is electrically connected to the secondary winding, a negative pole of the second diode D4 is electrically connected to the secondary winding, and a positive pole of the second diode D4 is electrically connected to the second terminal of the optocoupler OP1. Wherein, the second voltage sampling circuit is mainly formed by a resistor R27, a resistor R30, a resistor R35 and a resistor 36.

Specifically, in this embodiment, after the external power grid inputs a voltage to the charging circuit 100, the voltage is rectified and filtered and then transmitted to the primary winding of the transformer T1, and then, the secondary winding of the transformer T1 outputs a direct-current voltage to the energy storage unit 200 (CON1 in FIG. 6, BAT+ indicates a supply voltage of the energy storage unit 200) to realize changing; the second current sampling circuit is used for acquiring a current of the energy storage unit 200 and converting the current into a voltage signal, and when the current of the energy storage unit 200 reaches a preset value, the second switch transistor Q7 will be turned on to pull down the voltage of the optocoupler OP1 to turn off the drive chip U1, such that a battery is prevented from being over-charged; the voltage stabilizing circuit divides the output voltage of the transformer T1 by means of the second voltage sampling circuit and then transmits the divided voltage to the stabilivolt U2, the stabilivolt U2 compares the acquired voltage with a reference voltage and then outputs a corresponding voltage control signal that is transmitted to the optocoupler OP1, and the optocoupler OP1 feeds the voltage control signal back to the drive chip U1 to regulate the output voltage of the transformer T1, such that a stable charging voltage is provided for the energy storage unit 200; and the second diode D4 is used for limiting the input voltage to protect the stabilivolt.

Figure 7:
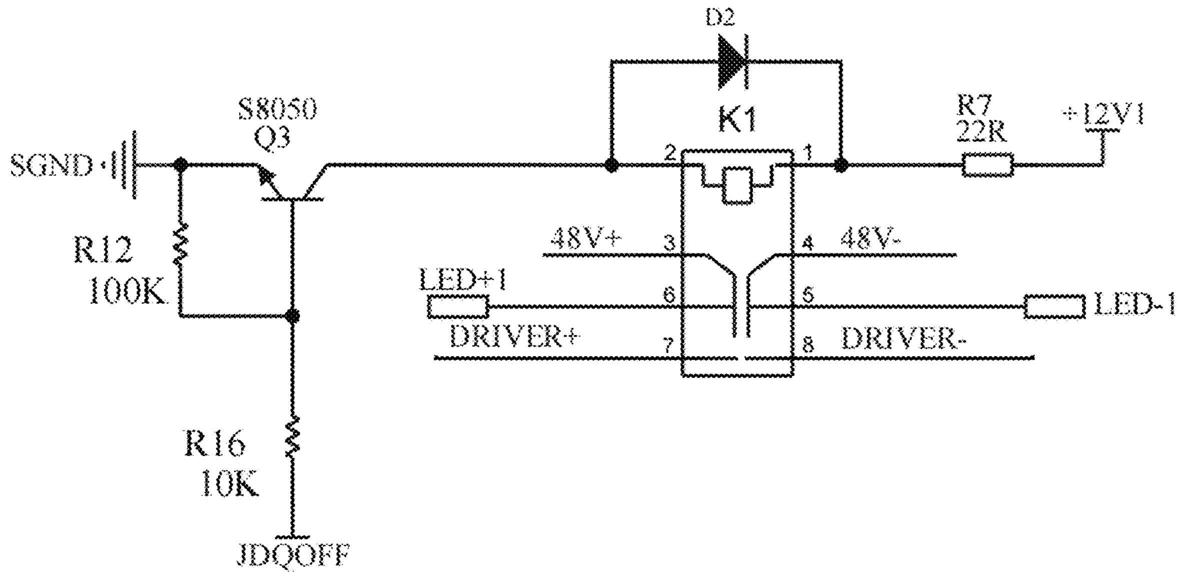
FIG. 7 is a schematic circuit diagram of a relay circuit according to one embodiment of the application.

Furthermore, the emergency power supply circuit further comprises a relay circuit. Referring to FIG. 7 which is a schematic circuit diagram of the relay circuit, the relay circuit comprises a relay K1 and a fifth switch transistor Q3, wherein a first terminal of the relay K1 is electrically connected to a first terminal of the fifth switch transistor Q3, a second terminal of the relay K1 is electrically connected to the boost unit 510 and is configured to be electrically connected to the external load 800, a second terminal of the fifth switch transistor Q3 is electrically connected to the main control unit 510, and a third terminal of the fifth switch transistor Q3 is grounded.

Specifically, in this embodiment, when detecting a fault of a mains supply, the main control unit 300 outputs a drive signal to the boost control circuit 700, the auxiliary power supply control circuit 600 and the relay circuit; when the relay circuit receives a control signal, such as a high-level signal, transmitted from the main control unit 300, the fifth switch transistor Q3 will be turned on, and the relay K1 will be closed to drive the external load such as an LED unit.

Figure 8:
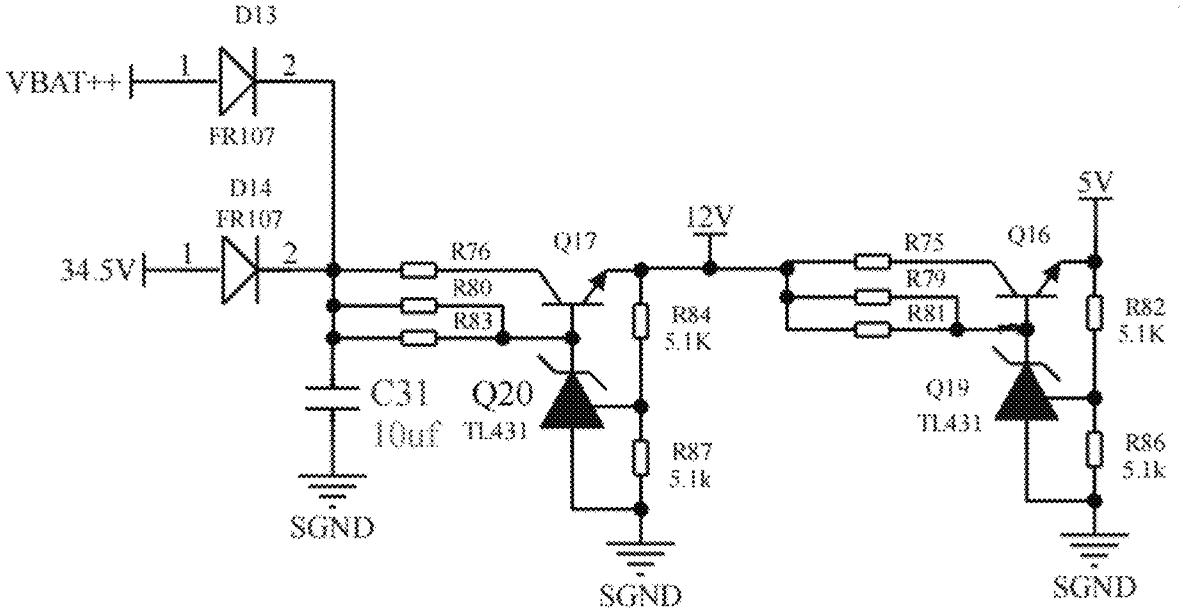
FIG. 8 is a schematic circuit diagram of a power conversion circuit according to one embodiment of the application.

In addition, in this embodiment, power is supplied to the circuits by an auxiliary power supply or by a direct current of the external power grid obtained after rectification and conversion, for example, by a power conversion circuit in FIG. 8; the auxiliary supply voltage VBAT++ and the direct current 34.5V are connected to an input terminal of a first voltage stabilizing and conversion circuit by means of a diode D13 and a diode D14 respectively, an output terminal of the first voltage stabilizing and conversion circuit is connected to an input terminal of a second voltage stabilizing and conversion circuit, the first voltage stabilizing and conversion circuit is used for converting the auxiliary power voltage VBAT++ or the direct current 34.5V into a stable 12V voltage to supply power to related circuits, and the second voltage stabilizing and conversion circuit is used for converting the 12V voltage transmitted from the first voltage stabilizing and conversion circuit into a stable 5V voltage to supply power to the main control unit. The voltage stabilizing and conversion circuit comprises a stabilivolt Q20 or Q19 and a triode Q17 or Q16, wherein the stabilivolt Q20 or Q19 is used for providing a reference voltage source and controlling an output of the triode Q17 or Q16 according to a feedback voltage to regulate an output voltage.

According to the emergency power supply circuit provided by the embodiments of the application, the energy storage unit is charged by the charging circuit, and the main control unit monitors an output voltage of the charging circuit; when it is detected that the charging circuit is abnormal, the auxiliary power supply is connected to the energy storage unit by means of the auxiliary power supply control circuit to charge the energy storage unit to ensure the power supply stability of the energy storage unit; moreover, the energy storage unit is connected to the boost unit by means of the boost control circuit to boost an output voltage of the energy storage unit so as to drive the external load by means of the boosted voltage to ensure that the output voltage satisfies the operating voltage requirement of the load; and the boost circuit is connected to the drive control unit by means of the feedback unit to regulate the output voltage in real time so as to provide a stable boosted voltage for the load to guarantee the operating stability of the load.

One embodiment of the application provides a lighting device, comprising the emergency power supply circuit described above. The lighting device may be an emergency lamp.

It should be noted that the embodiments of the application are described progressively, the differences of each embodiment from other embodiments are emphatically described, and the similarities between different embodiments can be referred to mutually.

It should also be noted that terms “first” and “second” in the application are merely for the purpose of description and should not be construed as indicating or implying relative importance or implicitly indicating the number of technical features referred to. Therefore, a feature defined by “first” or “second” may explicitly or implicitly indicate the inclusion of one or more said features. In the description of the embodiments of the application, “multiple” means two or more, unless otherwise expressly defined. Terms “comprise” and “include” or any other variants intend to indicate non-exclusive inclusion, so a process, method, article or device comprising a series of elements not only comprises the elements that are clearly listed, but also comprises other elements that are not clearly listed or comprises inherent elements of the process, method, article or device. Unless otherwise further defined, an element defined by “comprise one . . . ” shall not exclude other identical elements in a process, method, article or device comprising said element.

With reference to the description of the above embodiments, those skilled in the art can implement or use the application. Various modifications of these embodiments will be obvious for those skilled in the art, and the general principle defined by the contents of the application can be implemented in other embodiments without departing from the spirit or scope of the application. Therefore, the application will not be limited to the embodiments illustrated here and has a broadest range in conformity with the principle and novel features disclosed by the application.

What is claimed is:

1. An emergency power supply circuit, comprising a charging circuit, an energy storage unit, a main control unit, an auxiliary power supply, a boost circuit, an auxiliary power supply control circuit and a boost control circuit, wherein the boost circuit comprises a boost unit, a feedback unit and a drive control unit;

the charging circuit is electrically connected to the energy storage unit and the main control unit and is configured to be electrically connected to an external power grid, the auxiliary power supply control circuit is electrically connected to the auxiliary power supply, the main control unit and the energy storage unit, the boost control circuit is electrically connected to the boost unit, the energy storage unit and the main control circuit, the drive control unit is electrically connected to the boost unit and the feedback unit, and the boost unit is configured to be electrically connected to an external load.

2. The emergency power supply circuit according to claim 1, wherein the boost unit comprises an inductor and a first switch transistor, one terminal of the inductor is electrically connected to the boost control circuit, the other terminal of the inductor is electrically connected to a first terminal of the first switch transistor and is configured to be electrically connected to the external load, a second terminal of the first switch transistor is electrically connected to the drive control unit, and a third terminal of the first switch transistor is electrically connected to the feedback unit.

3. The emergency power supply circuit according to claim 2, wherein the boost circuit further comprises a first diode and a first rectifier and filter circuit, a positive pole of the first diode is electrically connected to one terminal of the inductor, a negative pole of the first diode is electrically connected to a first terminal of the first rectifier and filter circuit, a second terminal of the first rectifier and filter circuit is electrically connected to the other terminal of the inductor, and a third terminal of the first rectifier and filter circuit is electrically connected to the external load.

4. The emergency power supply circuit according to claim 2, wherein the feedback unit comprises a first voltage sampling circuit and a first current sampling circuit, the first voltage sampling circuit is electrically connected to the other terminal of the inductor and the drive control circuit, and the first current sampling circuit is electrically connected to the third terminal of the first switch transistor and the drive control circuit.

5. The emergency power supply circuit according to claim 1, wherein the charging circuit comprises a second rectifier and filter circuit, a transformer, a drive chip and a charging protection circuit, the second rectifier and filter circuit is electrically connected to a primary winding of the transformer and is configured to be electrically connected to the external power grid, the drive chip is electrically connected to the primary winding and one terminal of the charging protection circuit, a secondary winding of the transformer is electrically connected to the energy storage unit, and the other terminal of the charging protection circuit is electrically connected to the energy storage unit.

6. The emergency power supply circuit according to claim 5, wherein the charging protection circuit comprises an optocoupler, a second switch transistor and a second current sampling circuit, the second current sampling circuit is electrically connected to the energy storage unit and a first terminal of the second switch transistor, a second terminal of the second switch transistor is electrically connected to a first terminal of the optocoupler, a third terminal of the second switch transistor is grounded, a second terminal of the optocoupler is electrically connected to the secondary winding, a third terminal of the optocoupler is electrically connected to the drive chip, and the fourth terminal of the optocoupler is grounded.

7. The emergency power supply circuit according to claim 6, wherein the charging circuit further comprises a voltage stabilizing circuit, the voltage stabilizing circuit comprises a stabilivolt, a second diode, a second voltage sampling circuit and the optocoupler and is electrically connected to the first terminal of the optocoupler and one terminal of the second voltage sampling circuit, the other terminal of the second voltage sampling circuit is electrically connected to the secondary winding, a negative pole of the second diode is electrically connected to the secondary winding, and a positive pole of the second diode is electrically connected to the second terminal of the optocoupler.

8. The emergency power supply circuit according to claim 1, wherein the boost control circuit and the auxiliary power supply control circuit each comprise a third switch transistor and a fourth switch transistor, a first terminal of the third switch transistor is electrically connected to the main control unit, a second terminal of the third switch transistor is electrically connected to a first terminal of the fourth switch transistor, a third terminal of the third switch transistor is grounded, a second terminal of the fourth switch transistor is electrically connected to the energy storage unit, and a third terminal of the fourth switch transistor is electrically connected to the boost unit or the auxiliary power supply.

9. The emergency power supply circuit according to claim 1, further comprising a relay circuit, wherein the relay circuit comprises a relay and a fifth switch transistor, a first terminal of the relay is electrically connected to a first terminal of the fifth switch transistor, a second terminal of the relay is electrically connected to the boost unit and is configured to be electrically connected to the external load, a second terminal of the fifth switch transistor is electrically connected to the main control unit, and a third terminal of the fifth switch transistor is grounded.

10. A lighting device, comprising the emergency power supply circuit according to claim 2.

* * * * *